(12) United States Patent
Dellea et al.

(10) Patent No.: US 10,357,799 B2
(45) Date of Patent: Jul. 23, 2019

(54) METHOD FOR PRODUCING A SUBSTRATE BY SPRAYING PARTICLES ONTO A COMPACT FILM OF SOLID PARTICLES ON A CARRIER LIQUID

(71) Applicant: COMMISSARIAT A L'ENERGIE ATOMIQUE ET AUX ENERGIES ALTERNATIVES, Paris (FR)

(72) Inventors: Olivier Dellea, La Talaudiere (FR); Philippe Coronel, Barraux (FR); Nicolas Dreuilles, Aussonne (FR); Pascal Fugier, Bernin (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/890,857

(22) PCT Filed: May 15, 2014

(86) PCT No.: PCT/EP2014/059981
§ 371 (c)(1),
(2) Date: Nov. 12, 2015

(87) PCT Pub. No.: WO2014/184303
PCT Pub. Date: Nov. 20, 2014

(65) Prior Publication Data
US 2016/0101432 A1     Apr. 14, 2016

(30) Foreign Application Priority Data
May 16, 2013   (FR) ..................... 13 54398

(51) Int. Cl.
*B05D 1/00* (2006.01)
*B05D 1/02* (2006.01)
(Continued)

(52) U.S. Cl.
CPC ............... *B05D 1/02* (2013.01); *B05D 1/20* (2013.01); *B32B 27/14* (2013.01);
(Continued)

(58) Field of Classification Search
CPC .. B05D 1/00; B05D 2252/00; B05D 2401/32; B05D 2451/00; B32B 27/00; B32B 2457/00
See application file for complete search history.

(56) References Cited

U.S. PATENT DOCUMENTS 3,396,057 A * 8/1968 Webb ................. H01L 31/00
136/250
5,021,315 A * 6/1991 Goldman ........... G03G 9/0832
427/217

(Continued)

FOREIGN PATENT DOCUMENTS

WO    WO 99/38623 A1    8/1999
WO    WO 01/89717 A2    11/2001
(Continued)

OTHER PUBLICATIONS

International Search Report dated Aug. 4, 2014, in PCT/EP2014/059981 filed May 15, 2014.
(Continued)

*Primary Examiner* — Gordon Baldwin
*Assistant Examiner* — Mohammad Mayy
(74) *Attorney, Agent, or Firm* — Oblon, McClelland, Maier & Neustadt, L.L.P.

(57) ABSTRACT

A method for producing an assembly of particles bound by a substrate, including: making a compact film of solid particles floating on a carrier liquid, the solid particles potentially holding objects between them; spraying particles onto a face of the compact film opposite to the one immersed in a carrier liquid, to create a substrate-forming-skin adher-
(Continued)

ing to the solid particles; and extracting an obtained assembly outside the carrier liquid.

18 Claims, 8 Drawing Sheets

(51) Int. Cl.
    *B05D 1/20*     (2006.01)
    *B32B 27/14*     (2006.01)

(52) U.S. Cl.
    CPC ...... *B05D 2252/02* (2013.01); *B05D 2401/32* (2013.01); *B05D 2451/00* (2013.01); *B32B 2457/00* (2013.01); *B32B 2551/00* (2013.01)

(56) References Cited

U.S. PATENT DOCUMENTS

| | | | |
|---|---|---|---|
| 6,423,172 B1 | 7/2002 | McArdle et al. | |
| 7,160,297 B2 * | 1/2007 | Nesbitt | A47J 36/025 427/180 |
| 2005/0129867 A1 * | 6/2005 | Picard | B01D 69/122 427/434.3 |
| 2005/0281944 A1 | 12/2005 | Jang | |
| 2007/0231498 A1 | 10/2007 | Picard et al. | |
| 2008/0032074 A1 * | 2/2008 | Doi | B41M 5/52 428/34.1 |
| 2010/0155325 A1 * | 6/2010 | Zhang | B01D 39/1692 210/500.21 |
| 2011/0135834 A1 | 6/2011 | Schneider et al. | |
| 2013/0079482 A1 * | 3/2013 | Gerlinger | C08F 220/18 526/320 |

FOREIGN PATENT DOCUMENTS

| | | |
|---|---|---|
| WO | WO 2008/014604 A1 | 2/2008 |
| WO | WO 2013/117678 A1 | 8/2013 |

OTHER PUBLICATIONS

French Search Report dated Feb. 6, 2014, in French Application FR 1354398 filed May 16, 2013.
Bardosova, Maria et al., "The Langmuir-Blodgett Approach to Making Colloidal Photonic crystals from Silica Spheres", Advanced Materials, vol. 22, No. 29, pp. 3104-3124, (2010), XP055042092.
Kinge, Sachin et al., "Self-Assembling Nanoparticles at Surfaces and Interfaces", Chemical Physics and Physical Chemistry, vol. 9 (1), pp. 20-42, 1 page, ISSN 1439-4235, (2008).
Isa, Lucio et al., "Particle Lithography from Colloidal Self-Assembly at Liquid-Liquid Interfaces", ACSNANO, vol. 4, No. 10, pp. 5665-5670, (2010).
Retsch, Markus et al., "Fabrication of Large-Area, Transferable Colloidal Monolayers Utilizing Self-Assembly at the Air/Water Interface", Macromolecular Chemistray and Physics, vol. 210, pp. 230-241, (2009).

\* cited by examiner

METHOD FOR PRODUCING A SUBSTRATE BY SPRAYING PARTICLES ONTO A COMPACT FILM OF SOLID PARTICLES ON A CARRIER LIQUID

The invention relates to the field of methods for producing assemblies of solid particles forming a compact film and being bound by a substrate. It more specifically relates to the production of such assemblies of a flexible nature.

More precisely, it relates to the production of an assembly the film of ordered solid particles of which, preferably of the monolayer type, has a solid particle size between a few nanometers and several hundreds of micrometers. The solid particles, preferably having a spherical shape, can for example be silica particles.

The invention also relates to the production of an assembly the film of ordered solid particles of which is intended to be structured, more particularly by integrating thereto other types of particles, and/or objects held in place by these same particles.

In the case of the integration of objects into the compact film, devices of a hybrid nature in particular have to be produced, such as for example sensors. By way of indication, a hybrid device associates on a same substrate, by definition, objects having various functions, for example electronic, optical, electro-optical, piezo-electrical, thermoelectric, mechanical, etc. functions.

Objects likely to be integrated into the film of solid particles are for example:
- active electronic components, such as transistors, microprocessors, integrated circuits, etc.;
- passive or active components of electronics, such as resistors, capacitances, diodes, photodiodes, coils, conductor tracks, welding preforms, etc.;
- optical components, such as lenses, micro-lenses, diffraction gratings, filters, etc.;
- cells, micro-cells, micro-batteries, photo-detectors, solar cells, RFID systems, etc.;
- active or passive nano- or micro-metric particles or aggregates, for example of the oxide, polymer, metal, semiconductor, Janus (particles having two faces with different natures or properties), nanotubes, etc. type.

More particularly, the invention relates to the integration of objects the dimensions of which extend:
- for the components: from the microscopic scale (a few tens of microns), to the macroscopic scale (more than a ten of centimeters); and
- for particles and aggregates: from the nanometer to several hundreds of microns.

More generally, the invention has applications in the field of fuel cells, optics, photonics, polymer coating, chips, MEMs, surface structuring for organic electronics and photovoltaics, etc.

The object of the invention is a method for producing an assembly of particles, preferably being ordered, bound by a substrate, comprising the following steps of:
- making a compact film of solid particles floating on a carrier liquid, the solid particles potentially holding objects between them;
- spraying particles onto the face of the compact film opposite to the one immersed in said carrier liquid, so as to create a substrate-forming-skin adhering to said solid particles; and
- extracting the obtained assembly outside the carrier liquid.

The invention is remarkable in that it completely breaks with the prior art in which the compact film of particles was always deposited on a substrate placed at the outlet of the transfer area comprising the carrier liquid. On the contrary, the invention offers to make a substrate-forming skin whereas the compact film is still on the carrier liquid, by spraying particles onto the emerged face of the film.

The invention has numerous advantages among which a simple implementation of the step of making the substrate-forming skin. Moreover, with respect to the solutions of prior art, it considerably limits the risk of destructuring the film and/or modifying the location of the objects integrated into this film.

Furthermore, the invention is no longer restricted by the commercially available substrates, since it now lies on a concept of particle spraying. The nature of the obtained substrate can thus be highly diversified and therefore adapt at best to all the considered applications. In this respect, as a function of the encountered needs, it is for example possible to adapt several parameters such as the thickness of the skin, its composition, etc.

Incidentally, with this spraying technique, the obtained substrates can have a much better flexibility, in particular thanks to a low thickness. Thus, the average thickness of the substrate-forming skin can be provided to only correspond to 50 to 99% of the average thickness of the assembly comprising this substrate, the film of solid particles bound by this substrate, and possibly objects held by these same solid particles. Preferably, the substrate-forming skin is made so as to have an average thickness between 1 and 100 µm.

This great flexibility is particularly advantageous when the obtained assemblies are superimposed for making a device with several stacked layers, since it is the general flexibility of the obtained device which is improved.

Still assuming that assemblies are stacked, the invention is very advantageous in that it makes it possible to easily functionalize the substrate, which is then able to provide diversified connections between the stacked assemblies.

As mentioned above, the solid particles are preferably ordered.

According to an alternative, objects can be simply placed on the solid particles.

Preferably, the step of spraying particles is made by a vaporization of a liquid or by nebulization.

Preferably, the particles sprayed during the step of spraying particles comprise polymerizable monomers, and even more preferably photopolymerizable monomers.

Preferably, the carrier liquid is located in a transfer area comprising an inlet of solid particles as well as an outlet of solid particles, the transfer area is continuously supplied with solid particles through said inlet, and said step of extracting the obtained assembly is continuously performed through said outlet. Alternatively, the extraction could be made with the static assembly on the carrier liquid, manually with appropriate tools, or in an automated way.

In the case of a continuous film formation and continuous extraction, said step of making the compact film of solid particles on the carrier liquid is preferably implemented by making particles build up on a stop placed at the outlet of the transfer area.

In this configuration, the stop is preferably a roller and said step of extracting the assembly through the outlet of the transfer area is performed by rotating said roller. Preferably, the roller rotation is free and accompanies the pulling of the assembly made by any other means. Alternatively, the roller is motorised and due to its rotation, causes the obtained assembly to be extracted.

Preferably, the method implements a tilted ramp for circulating solid particles, connected to said inlet of the transfer area, and on which said carrier liquid is also preferably intended to circulate.

However, it is noted that the compact film of particles, the concept of which is for example disclosed in the document by Sachin Kinge, "Self-Assembling Nanoparticles at Surfaces and Interfaces", Chem Phys Chem 2008, 9, 20-42, can be obtained at the surface of the carrier liquid by any technique known to those skilled in the art, for example by compression, and/or dipole-dipole interaction, and/or by magnetic field, etc.

The dipole-dipole interaction technique applies for the facetted particles, for example tetrahedral, cubic, or even octahedral particles. With these shapes, the dipole-dipole interactions play a significant role in organising the particles. The dipole moments are generated inside these particles, due to the polarity differences between the facets.

The technique of organisation by magnetic field is used with magnetic nanoparticles that can be ordered using an intense magnetic field, generating strong interactions between the particles.

The compression technique is particularly known from the document by Lucio Isa et al., "Particle Lithography from Colloidal Self-Assembly at Liquid-Liquid Interfaces", acsnano, VOL. 4 ■ NO. 10 ■ 5665 -5670 ■ 2010, from the document by Markus Retsch, "Fabrication of Large-Area, Transferable Colloidal Monolayers Utilizing Self-Assembly at the Air/Water Interface", Macromol. Chem. Phys. 2009, 210, 230-241, or even from the document by Maria Bardosova, "The Langmuir-Blodgett Approach to Making Colloidal Photonic Crystals from Silica Spheres", Adv. Mater. 2010, 22, 3104-3124.

This compression technique also comprises a solution with a tilted ramp described in document CA 2 695 449. Part of the energy necessary for ordering particles in a normal state is then here brought by the tilted ramp conveying the carrier liquid and the particles. Other solutions are however possible, such as setting in motion, using a pomp, the carrier liquid on a horizontal plane the downstream part of which constitutes the transfer area of the particles. Another solution consists in replacing the pump by a blower enabling an air stream to be applied at the surface of the carrier liquid, on which the particles to be transferred float. As mentioned above, other solutions are however worth considering, without departing from the scope of the invention, such as a compression work of particles via a so-called "Langmuir-Blodgett" technique.

Preferably, said step of spraying particles is performed so as to obtain a substrate-forming skin having a plurality of areas with different characteristics. They can be for example areas with different compositions, for example electrically insulating areas and electrically conductive areas. Nevertheless, they can have any other type of characteristics which differ between the areas, such as the thickness, the level of transparency to light, the flexibility, etc.

Preferably, said different areas of the substrate are obtained using one or more masks, whatever the extraction technique chosen for the assembly, that is whether the latter is intended to be extracted from the carrier liquid in a static position thereon, or by pulling.

Preferably, said substrate-forming skin is made from a composition comprising a polymerizable, preferably photo-crosslinkable compound, preferably acrylonitrile. Other materials are of course worth considering, such as a silicone resin-, epoxy resin- and/or polyurethane resin-based substance.

Anyhow, polymerization is conventionally performed, for example thermally and/or optically, and occurs at least partly when the solid particles are still in the transfer area. Extracting the assembly outside the transfer area is performed when the polymerization level, partial or total, enables this assembly to be manipulated without being damaged.

Preferably, said sprayed substance is hydrophobic, and preferably also at the polymerized solid state. More generally, particularly taking into account the cases where the carrier liquid is not water, it is noted that the sprayed substance turns out to be little or non-miscible with the carrier liquid.

Preferably, said compact film of solid particles holds at least one object among the group of silicon chips, micro-batteries, components of organic electronics, metal elements, photovoltaic cells, cells and micro-cells. These objects in particular enable devices with a hybrid nature, such as for example sensors, to be produced.

The invention also relates to a method for producing a device from at least two assemblies each obtained by implementing a method such as described above, both assemblies being then superimposed and aligned. In this case, the substrate-forming skins can advantageously perform various connections between the films/objects of directly consecutive assemblies.

For example, the device is obtained from at least a first assembly and a second assembly superimposed and arranged in contact with each other, so that the first assembly comprises a substrate arranged between the compact film of solid particles of the first assembly and the compact film of solid particles of the second assembly, and so that said substrate comprises an electrically conductive area providing the electrical connection between electrically conductive parts of the first and second films of solid particles. As discussed above, these particles can be particles of the film and/or an object or objects held by at least one of these films.

Preferably, the method is implemented for producing an opto-electronic device.

Preferably, the ratio of the large dimension of the solid particles of the compact film, and that of the objects integrated into the film, is between $10^4$ and $10^8$. By way of example, the solid particles forming the compact film can have a large dimension in the order of 1 nm to 500 µm, whereas the objects can in turn have a large dimension up to about 30 cm. It is also possible to use glass fibres with a diameter of about 10 µm and a length between 500 µm and 4 mm. The advantage of these fibres lies in the mechanical reinforcement of the membrane.

Preferably, the solid particles of the compact film are silica beads with a diameter of about 1 µm. It is nevertheless noted that the film can be heterogeneous, that is can have beads of different sizes and/or different compositions.

Preferably, each object has a large dimension greater than 0.2 cm, and preferably lower than 30 cm. The latter value can be adapted as a function of the width of the obtained film. Indeed, the large dimension of each object can reach a value close to the final width of this film. Objects of micrometric or nanometric size can also be used, without departing from the scope of the invention.

The object integrated into the film, certain examples of which have been previously cited, can have any shape, not necessarily a planar shape, possibly having one or more radii of curvature, for example lower than 5 cm, or even integrating pads useful for the connectivity. Also for the solid particles of the film, the shapes can be varied, but are preferably homogeneous.

The invention also provides the production of complex devices such as for example sensors (opto-electronic device) comprising detection elements (for example particles), one or more energy recovery systems (photovoltaic cell, piezoelectric film, fuel cell), an energy storage system (microbattery), an information management system (silicon chip), a communication system (RFID chip), electrical connection elements (conductor tracks), electronic components (resistors, capacitors), welding elements (preforms). Objects necessary for obtaining these devices are then arranged accordingly on the obtained film(s), these objects being superimposed if need be.

Other advantages and features of the invention will appear in the non-limiting detailed description below.

This description will be made with regards to the appended drawings among which.

Figure 1:
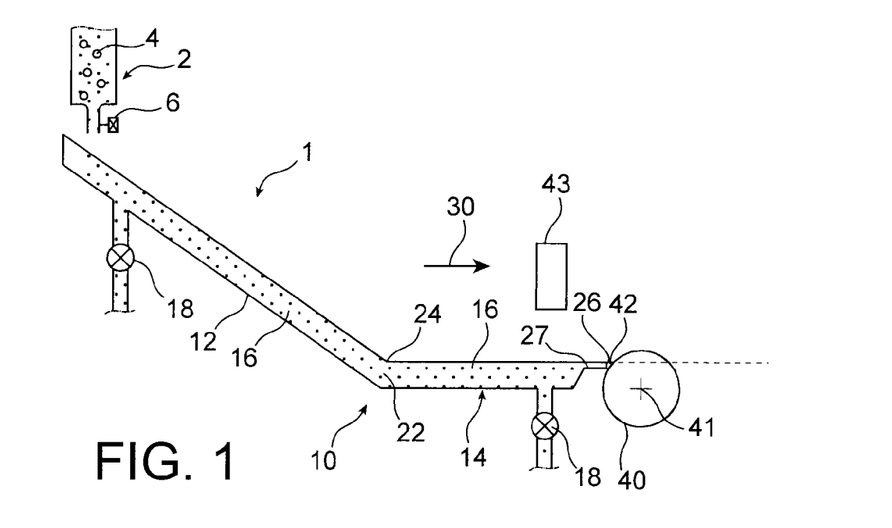
FIG. 1 shows a facility for implementing a production method according to a preferred embodiment of the present invention, in a schematic cross-section taken along line I-I of FIG. 2.
Figure 2:
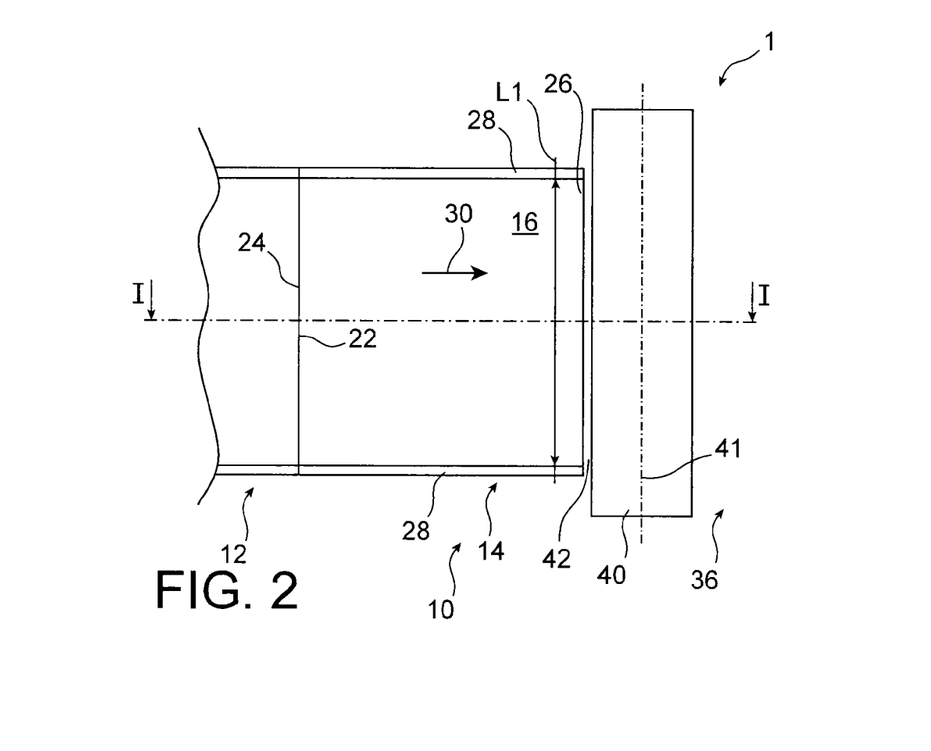
FIG. 2 represents a top schematic view of the facility shown in FIG. 1.

With reference first to FIGS. 1 and 2, a facility 1 for producing an assembly comprising a compact film of solid particles bound by a substrate is represented.

The facility 1 includes a device 2 for dispensing particles 4, the size of which can be between a few nanometers and several hundreds of micrometers. The solid particles, having preferably a spherical shape, can for example be silica particles. Other particles of interest can be made of metal or metal oxide such as Platinum, $TiO_2$, of a polymer such as polystyrene or PMMA, or carbon, etc. As discussed above, the fibres also have a definite interest. To these examples can also be added the Janus-type particles, with two faces of distinct natures, and core-shell-type particles.

More precisely, in the preferred embodiment, the particles are silica spheres with a diameter of about 1 μm, stored in a solution in the dispensing device 2. The medium proportion is about 7 g of particles for 200 ml of solution, here butanol. Of course, for the sake of clarity, the particles represented in the figures assume a diameter greater than their real diameter.

The dispensing device 2 has a controllable injection nozzle 6 with a diameter of about 500 μm.

The facility also includes a liquid conveyor 10, integrating a tilted ramp 12 for circulating the particles, and a substantially horizontal transfer area 14, or even having a slight tilting so as to promote the discharge of the facility when necessary. The top end of the tilted ramp is provided to receive the particles injected from the dispensing device 2. This ramp is straight, titled by an angle between 5 and 60°, preferably between 10 and 30°, enabling particles to be conveyed towards the transfer area 14. Moreover, a carrier liquid 16 circulates on this ramp 12, up to the transfer area. This liquid 16 can besides be recirculated using one or two pumps 18, between the transfer area 14 and the top end of the ramp. It is here preferably deionized water, on which the particles 4 can float. However, a new liquid can be favoured via an open circulation circuit. It can also be an association of several non-miscible liquids.

The bottom end of this same ramp is connected to an inlet of the particle transfer area 14. This inlet 22 is located at an inflection line 24 marking the junction between the surface of the carrier liquid present on the tilting plane of the ramp 12, and the surface of the carrier liquid present on the horizontal part of the transfer area 14.

The particle inlet 22 is spaced out from a particle outlet 26 using two side rims 28 retaining the carrier liquid 16 in the area 14. These rims 28, facing each other and at a distance from each other, extend parallel to a main flowing direction of the carrier liquid and of the particles in the facility, this direction being schematized by the arrow 30 in FIGS. 1 and 2. The area 14 consequently assumes the shape of a corridor or open path at its inlet and its outlet, even if other geometries could be chosen, without departing from the scope of the invention.

The bottom of the downstream part of the transfer area has a plate slightly tilted upstream with respect to the horizontal direction, for example by a value in the order of 5 to 10°. It is the downstream end of this same plate 27, also referred to as a "blade", which partly defines the particle outlet 26.

The facility 1 is also provided with a stop 40 on which the solid particles are intended to build up to create their ordering. This stop preferably takes the shape of a roller 40 located at the particle outlet 26 of the transfer area 14. The axis 41 of the roller 40 is parallel to the outlet 26 of the area 14, near which this roller is located. Indeed, as detailed thereafter, the obtained assembly reaching the outlet 26 is provided to be easily transferred onto this roller 40, via a capillary bridge 42, also referred to as a meniscus, which connects it to the carrier liquid 16. Alternatively, the roller can be in direct contact with the transfer area, without departing from the scope of the invention. The abovementioned capillary bridge is then no longer required.

Here, the roller 40 can be freely rotating about its axis 41, or, more preferably, its rotation is restrained by an engine so as to avoid any risk of this roller rotating in the direction opposite to the normal direction for making the film.

In the example shown in the figures, the width of the roller 40 corresponds to the width of the area 14 and of its outlet 26. It is a width L1 which also corresponds to the width of the film of solid particles intended to be obtained.

Furthermore, at a downstream part of the transfer area 14, the facility comprises means 43 for vaporizing a liquid, the objective being to spray particles onto the obtained compact film before extraction outside the transfer area. To provide this vaporization of liquid, the means 43 can take the shape of a spray, also referred to as an aerosol spray, the objective of which is to ensure a spraying of fine droplets. Alternatively, projecting particles can be performed by nebulization, using means 43 then taking the shape of a nebulizer generally corresponding to an apparatus enabling a liquid to be transformed into a cloud of extremely fine particles (from a few micrometers to a few tens of micrometers), this cloud being also referred to as mist. This nebulization technique is also referred to as an atomization technique.

A method for producing an assembly according to an embodiment will now be described with reference to FIGS. 3 to 6.

Figure 3:
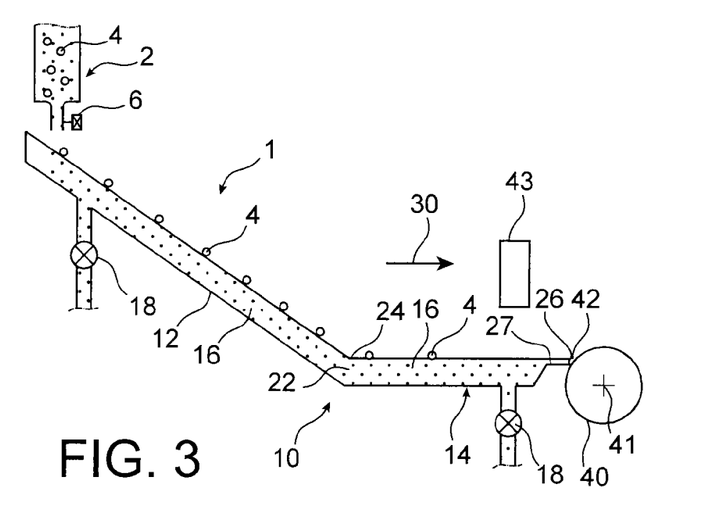
FIGS. 3 to 6 represent different steps of a production method implemented using the facility shown in the previous figures, according to a preferred embodiment.

First, the injection nozzle 6 is activated to start dispensing particles 4 onto the ramp 12. It consists in implementing an initial step of filling the transfer area 14, by the particles 4, with the carrier liquid 16 already at the level required in the area 14.

Figure 4:
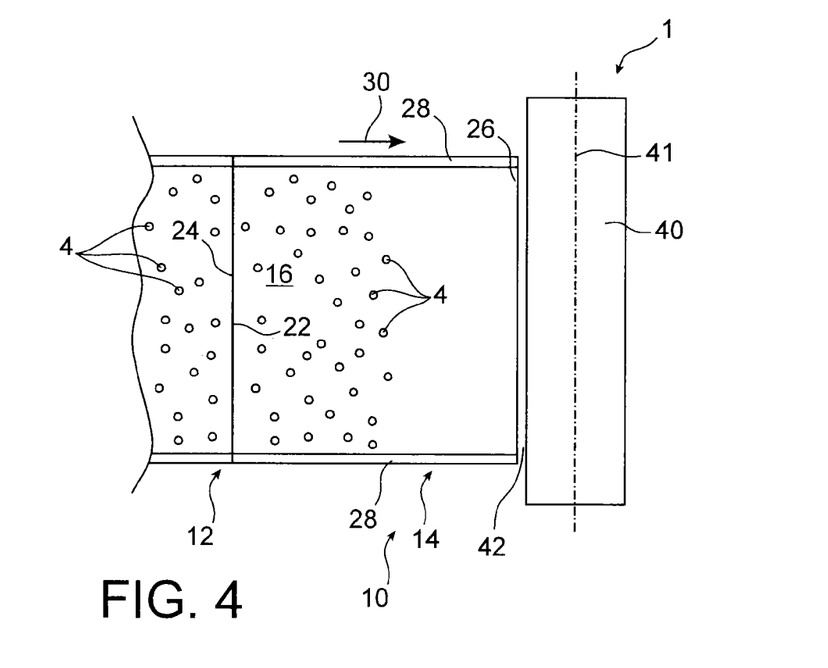

During this initiating phase, the particles dispensed by the device 2 circulate on the ramp 12, and penetrate the area 14 in which they disperse, as schematized in FIGS. 3 and 4.

As the particles 4 are injected on the ramp 12 and penetrate the transfer area 14, they abut against the roller 40 which remains static at this point, then the upstream front of these particles tends to shift upstream, in the direction of the inflection line 24. The injection of particles is continued even after this upstream front has exceeded the line 24, so that it raises on the tilted ramp 12.

Figure 5:
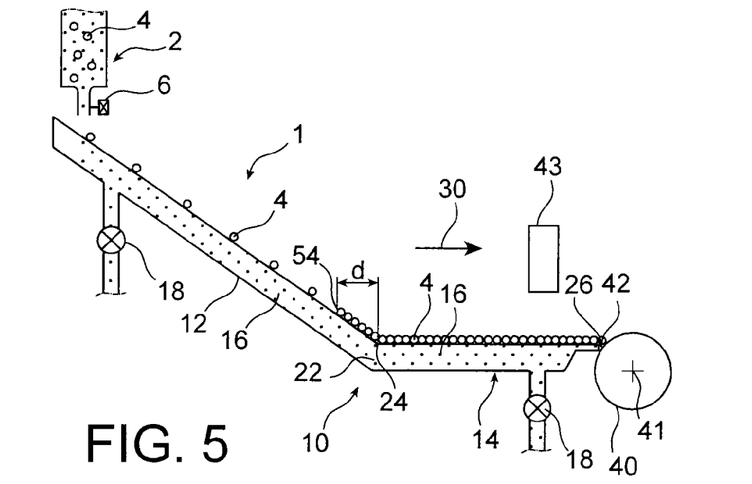

Indeed, it is provided that the upstream front of particles 54 raises on the ramp 12 so as to be located at a given horizontal distance "d" from the inflection line 24, as shown in FIG. 5. The distance "d" can be in the order of 30 mm.

At this moment, the solid particles 4 are ordered in the transfer area and on the ramp 12, on which they are automatically ordered, without any help, thanks in particular to their kinetic energy and to the capillary forces used at the time of the impact on the front 54. The ordering is such that the obtained compact film has a so-called "hexagonal compact" structure, in which each particle 4 is surrounded and contacted by six other particles 4 in contact with each other. It is then indifferently referred to as a compact film of particles, or a film of ordered particles.

Figure 6:
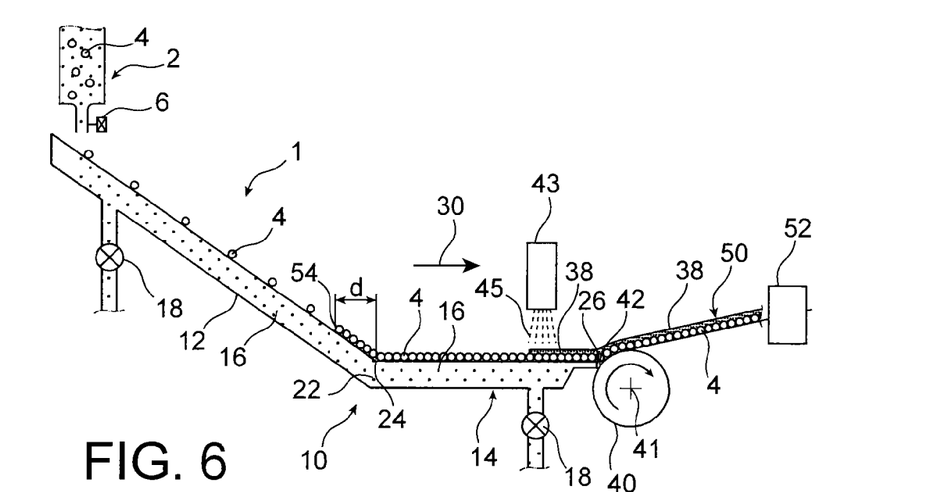

Once the ordered particles 4 forming the film cover the entire carrier liquid located in the transfer area 14, a step of spraying liquid particles onto the film is performed, using the spray 43. More precisely, as shown in FIG. 6, spraying fine droplets 45 is performed on the face of the compact film opposite the one immersed in said carrier liquid 16, that is the face of the film in contact with ambient air. This spraying is performed so as to create a substrate-forming skin 38 adhering to the ordered solid particles 4.

This skin is made from a composition comprising a polymerizable, preferably photo-crosslinkable component, such as acrylonitrile in order to obtain a substrate material from the family of acrylics. Consequently, even if they are not represented, the facility comprises means for polymerizing the vaporized substance.

Spraying is performed such that the sprayed particles remain on the face of the film located on the open air.

This spraying technique makes it possible in particular to avoid the risks of destructuring the compact film, especially with respect to the solutions of prior art implementing a running outer substrate.

In the described embodiment, the inlet 22 of the area 14 is continuously supplied with solid particles 4, whereas the extraction of the obtained assembly 50 downstream the spray 43 is also continuously performed through the outlet 26. Consequently, forming the skin 38 is performed upon the compact film passing under the spray 43, this film being preferably totally polymerized before extracting the assembly 50 outside the carrier liquid.

In this respect, as schematized in FIG. 6, this extraction is enabled by the rotation of the roller 40 along its axis 41. Indeed, its rotation enables the film to be continuously extracted downstream, while continuing to fulfil its stop function necessary for ordering the solid particles 4 more upstream in the transfer area 14. Pulling means 52 schematically represented in FIG. 6 can be used to apply the dynamics necessary for extracting the assembly 50. These means 52, located downstream the roller 40, then cause the latter to freely rotate under the effect of the friction and/or capillarity strains with the running assembly 50. Alternatively, instead of accompanying the pulling, the roller 40 could be motorized and thus apply itself the dynamics to the assembly 50.

During the running of the compact film in the transfer area, the injection of solid particles and the pulling speed of the assembly 50 are adjusted so that the front of particles remains in a substantially identical position. To do so, the flow rate of solid particles 4 can be in the order of 0.1 ml/min to several ml/min, whereas the linear speed of the assembly 50, also referred to as the pulling speed, can be in the order of a few mm/min to several hundreds of mm/min. As will be mentioned below, the supply with particles 4 can be temporarily stopped during the creation of patterns, or kept constant.

Figure 7:
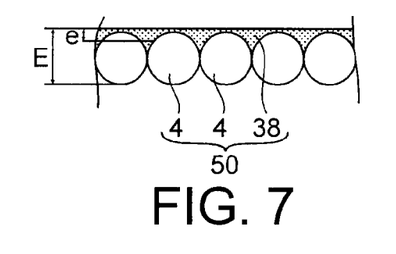
FIG. 7 represents an enlarged schematic view of the obtained assembly following the implementation of the method schematized in the figures.

Thus, the feature of the invention is to form the substrate whereas the film of ordered particles 4 is still located on the carrier liquid. This spraying technique enables low thicknesses of substrate to be obtained, while providing the adhesion to particles 4. As is schematized in FIG. 7, the average thickness "e" of the substrate-forming skin 38 corresponds to 50 to 99% of the average thickness "E" of the assembly 50 including the film of solid particles adhering to the substrate. For example, the substrate-forming skin is made so as to have an average thickness "e" between 1 and 100 With this low thickness, it is particularly possible to have a good flexibility for the assembly 50 continuously extracted from the transfer area. This assembly 50, thanks to its low thickness, thus takes itself the shape of a film that can have multiple applications such as those previously mentioned.

To further broaden the spectrum of applications that can be considered, it is possible to create a compact film with different solid particles 4 in terms of dimensions and/or materials.

For example, to obtain a heterogeneous film, dispensing particles of different natures in turn, which end up in the film with an order corresponding to the one in which they have been dispensed is enough. It is also possible to alternate between electrically insulated, electrically conductive, etc. solid particles 4.

Figure 8:
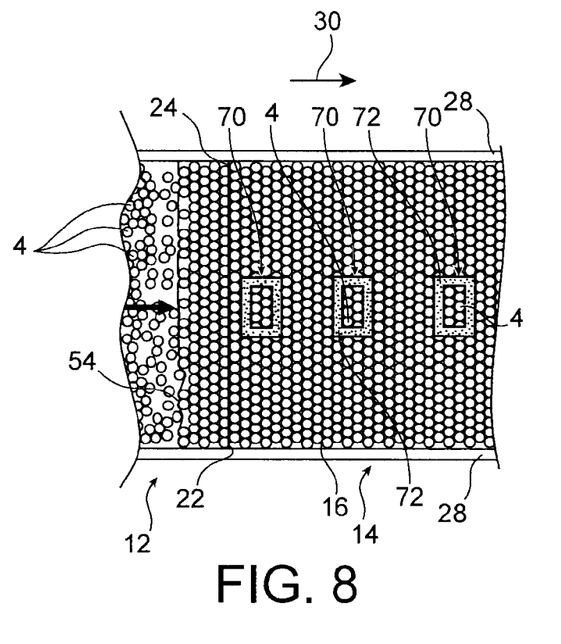
FIG. 8 represents a view showing a technique for structuring the compact film of particles.

Another possibility consists in intervening directly within the compact film. By way of indicating example, as schematized in FIG. 8, it is possible to create patterns 70 on the compact film 4, by depositing a substance 72 on the particles. Here, each pattern 70 takes the shape of a cord following a closed line, but could alternatively take any other shape deemed appropriate as a function of the encountered needs, such as a point shape or a surface shape. FIG. 8 thus shows an example of several patterns 70 defined using the deposited substance 72, enabling the particles dampened by this substance 72 to be held with respect to each other, the substance being here preferably of the type comprising a polymerizable compound. Of course, the particles 4 located inside and outside the cord-shaped contours 72 remain ordered.

Depositing the polymerizable substance is performed for example using a dispensing nozzle or an ink-jet head (not shown). This distance as well as the other operations specific to this structuration of the film can be performed by stopping the advancement of the film as well as the dispense of particles 4.

Upon contacting the particles, the substance 72 is able to adapt to the topography of the ordered film, and adheres to the particles 4 it covers. The polymerizable compound is for example a silicone resin, an epoxy resin, and/or a polyurethane resin. Polymerization is conventionally performed, for example thermally and/or optically, and occurs when the substance is still in the transfer area, before passing through the spray 43.

The substance 72 is then as a liquid or a slurry, to which additives can possibly be added before its dispense.

The substance 72, after being deposited on the film, adheres to the latter due to its composition.

The following step (not shown) consists in moving the particles 4 surrounded by the patterns 70, and in placing in the recessed areas solid particles of different natures. Objects can also be placed in these recessed areas, without departing from the scope of the invention.

Then, the structured film 4 passes under the spray 43 in order to be totally covered by the substrate 38.

Incidentally, it is noted that the step of spraying particles can also be controlled so as to obtain a substrate-forming skin 38 having a plurality of areas of different characteristics, preferably to adapt to the solid particles 4 of the film which also have different natures.

These areas have preferably different compositions as a function of the encountered needs. Other parameters can nevertheless evolve, such as the average thickness, the flexibility, the transparency, etc.

Figure 9A:
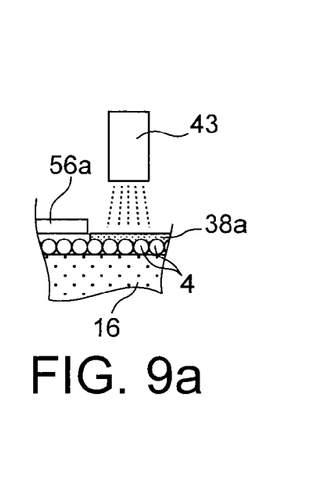
FIGS. 9a and 9b represent schematic views showing a technique for making a substrate with differentiated areas.
Figure 9B:
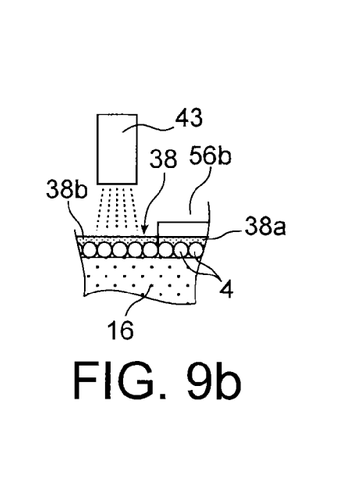

Forming several areas is for example performed by spraying liquid particles having different compositions. FIGS. 9a and 9b show an exemplary embodiment in which the alternate spraying of different compositions is performed using masks. Also, in FIG. 9a, the spray 43 sprays a first composition intended to form a first area 38a of the substrate 38 above certain particles of the compact film 4. In order for the first substance not to be deposited on the particles 4 more upstream in the film, a mask 56a is placed above these same particles, which are then covered by a second composition intended to form a second area 38b of the substrate 38. During this second spraying, the particles 4 already covered by the first substrate area 38a can also be covered by a mask 56b.

Of course, these sprayings can be performed using one or more sprays, alternately or simultaneously, and with the compact film being stopped or running on the carrier liquid.

As discussed above, differentiating areas within the substrate 38 is particularly interesting for producing a device 62 from at least two assemblies 50, each being obtained by implementing the method which has just being described, these two assemblies or more being superimposed after having been extracted from their respective transfer areas.

Figure 10:
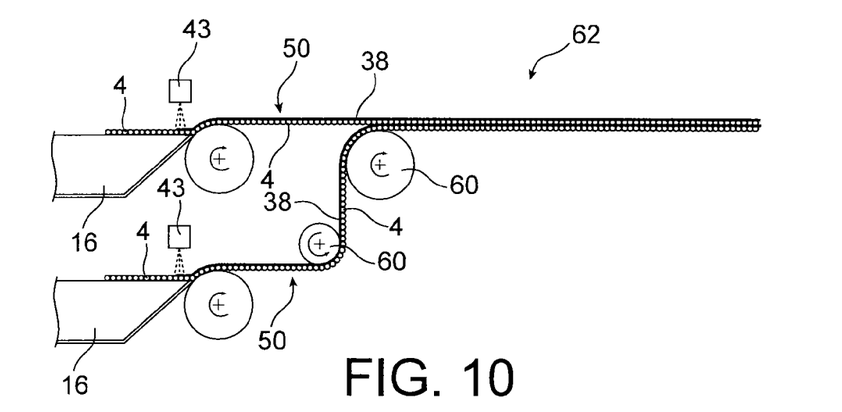
FIG. 10 shows a schematic view of the production of a device using several assemblies such as obtained by implementing the method schematized in the previous figures.

An exemplary embodiment is shown in FIG. 10, in which two similar facilities 1 are provided in order to form a first assembly 50 and a second assembly 50, respectively, which after having been extracted from the carrier liquid, are then brought into contact with one another after passing through rollers 60 or the like.

Consequently, the substrate 38 of the first assembly 50, the one under in the stacking, is interposed between the film of particles of the first assembly and the film of particles of the second assembly. This is in fact this substrate 38 which enables the adhesion between both superimposed assemblies 50 to be obtained.

Moreover, appropriate connections can thus be made between both films 4, since the substrates become an integral part of the thus created devices 62.

With this respect, it is noted that this aspect is also interesting to connect objects integrated into two directly consecutive assemblies. Thus, the invention provides the possibility to form compact films with particles holding objects between them, as will be described below.

Figure 11:
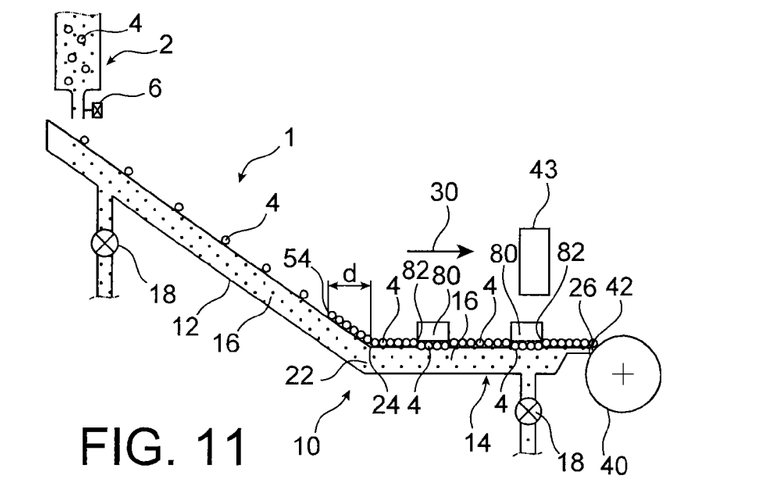
FIGS. 11 to 13 represent views showing other techniques for structuring the compact film of particles, aiming for integrating objects thereto.

An exemplary embodiment is shown in FIG. 11. Once the ordered particles 4 cover the entire carrier liquid located in the transfer area 14, the objects 80 to be integrated into the film can be placed above the film, at predetermined locations. This placing can be performed using conventional handling or gripping tools adapted to the nature, the shape and the dimension of the objects, such as claws, according to a technique referred to as "pick and place". Other solutions are considered without departing from the scope of the invention. As shown in FIG. 11, positioning the objects 80 on the film results in creating a depression of the particles 4 which support these same objects, in the carrier liquid 16 forming a conveyor. It is noted that these objects can be kept at the surface of the liquid by the surface tension of this liquid, the film of particles modifying the surface tension of the liquid, which can then aid, to some extent, in keeping these objects.

More precisely, the depressed particles 4 located under each object 80 then define a break of level 82 with the other surrounding particles 4. Then these same surrounding particles sandwich the periphery of each object 80, thus making it possible to hold them in position with respect to each other, as well as with respect to the fixed structure of the transfer area.

Each break of level 82 is preferably lower than the diameter of the particles 4, such that the depressed particles 4 are also kept and held by the surrounding particles. Nevertheless, when so-called "heavy" objects are put on the film, the surface of the liquid can be significantly deformed in a proportion equivalent to or even greater than the diameter of the particles. The most important thing is that the put object does not create a too significant discontinuity likely to lead to the tearing of the film of particles.

Positioning the first objects, as well as the following objects, is preferably performed without stopping the stream of particles coming from the ramp 12, although it could be otherwise, without departing from the scope of the invention.

The film 4 provided with the objects 80 then passes under the spray 43 so that the entirety is coated by the substrate 38.

Figure 12:
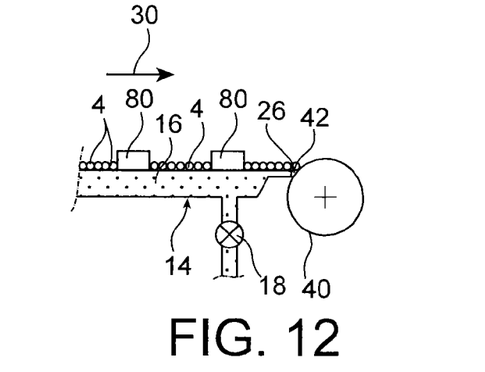

According to an alternative embodiment illustrated in FIG. 12, the objects 80 are not put on the film of ordered particles 4, but float on the carrier liquid 16 by being surrounded by this same film. Here, the objects 80 are then preferably placed on the carrier liquid before or during the formation of the compact film of particles, which is then constituted around these objects so as to hold them in position by sandwiching them at their periphery. Objects thus have a lower surface directly in contact with the carrier liquid. In this embodiment, it is also the film of ordered particles which enables the objects to be held in position and conveyed in an ordered way, until the substrate is deposited by spraying liquid particles.

It is indicated that several solutions are possible for depositing the objects 80. Among the preferred solutions, there is a solution consisting in providing one or more conveyors to convey these objects towards the transfer area.

Figure 13:
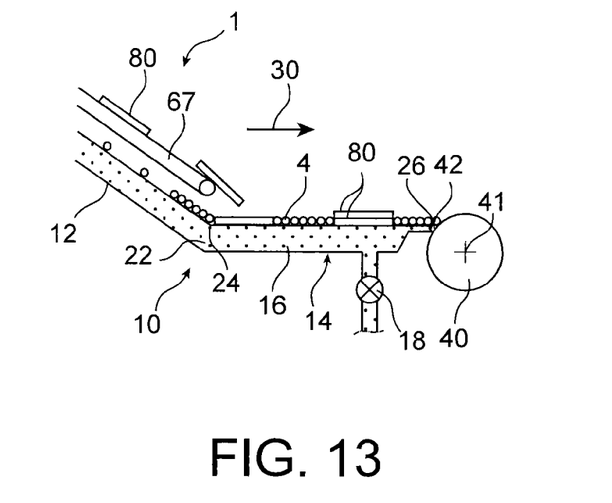

Each conveyor 67 is preferably parallel to the ramp 12, as shown in FIG. 13. The fixed or mobile conveyor 67 can be made in any way being appropriate to those skilled in the art, typically using a belt or a succession of rollers. The objects are thus conveyed and deposited by the conveyor 67 at a determined frequency as a function of the desired arrangement of these objects with respect to the film of particles 4.

Incidentally, with this technique, it is not only possible to deposit the objects 80 on the film of particles 4 as shown in FIG. 11, but also directly on the carrier liquid 16 before the particles 4 surround them in the transfer area 14, as schematized in FIG. 12. Alternatively, it is also possible to deposit the objects 80 on other similar objects, as represented in FIG. 13. On the latter, although it is not compulsory, objects 80 are indeed deposited on other objects 80 already integrated into the film of particles 4.

Whatever the chosen deposition technique, each object preferably has a large dimension greater than 0.2 cm and equal to or lower than L1, that is close to 30 cm. The thickness is between about a ten of micrometers and several tens of millimeters.

Certain types of objects such as solar cells, micro-batteries and organic components have a simple square, rectangle or even disk shape, with a low thickness, and a surface area in the order of 0.1 to 100 cm$^2$.

These components can include pads or pins on the face in contact with the liquid or on the opposite face receiving the substrate, to connect them. Other types of objects, aiming for example for detecting elements, generating energy or even information transport, can have complex shapes, for example bent or helical parts.

Besides, the ratio of the large dimension of the particles 4 to one of objects 80 accommodated in the film 4 is preferably between $10^4$ and $10^8$. Indeed, the large dimension of the particles is for example in the order of 1 nm to 500 µm, whereas the objects can have a large dimension up to about 30 cm.

The table below lists a few preferred examples for these objects.

Figure 14:
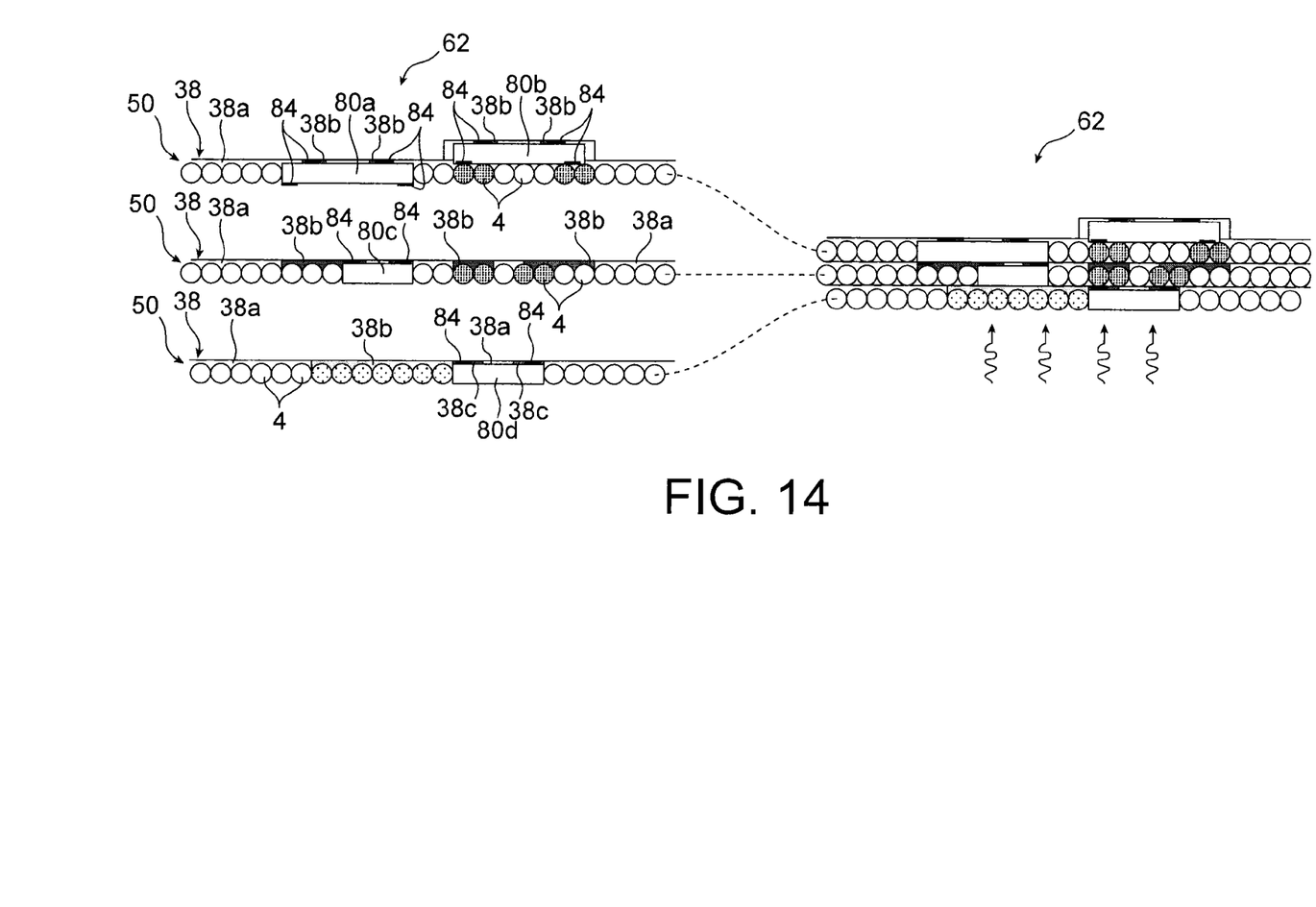
FIG. 14 shows a schematic view of the production of an opto-electronic device, using several assemblies such as obtained by implementing the method schematized in the previous figures.

The three assemblies are respectively referred to as the upper assembly, the intermediate assembly and the lower assembly.

The lower assembly 50 comprises a compact film of solid particles 4 which is structured in several ways. First, it comprises ordered solid particles 4 of different compositions, since clear beads 4 are electrically insulating whereas the slightly grey tinted beads are made of a different material, preferably metallic. Furthermore, the structuration of this film also comes from its integration of an object 80d, which is a photovoltaic cell surrounded by particles 4. This cell 80d has bonding pads directed upwards, and an opposite face directed downwards intended to constitute part of the outer surface of the final device 62.

The substrate 38 of this lower assembly 50 also has differentiated areas. The clearest, referenced 38a, are of an electrically insulating material, and the darkest, referenced 38c and coating the pads 84 of the cell 80d, are electrically conductive. The intermediate grey tinted area 38b, covering the metal beads 4, is transparent to light.

The intermediate assembly 50 comprises a compact film of solid particles 4 which is also structured in several ways. First, it comprises ordered solid particles 4 of different compositions, since the clear beads 4 are electrically insulating whereas the grey tinted beads are made of a different material, which is electrically conductive. Furthermore, the structuration of this film also comes from its integration of an object 80c, which is a photodiode surrounded by particles 4. This photodiode 80c has bonding pads 84 directed upwards, and an opposite face directed downwards intended to contact the light transparent area 38b of the substrate of the lower assembly. Similarly, the electrically conductive beads 4 are intended to contact the areas 38c covering the pads 84 of the photovoltaic cell 80d.

The substrate 38 of this intermediate assembly 50 also has differentiated areas. The clearest, referenced 38a, are made of an electrically insulating material, and the darkest, refer-

| Nature | Dimensions | Field of application |
| --- | --- | --- |
| Polyethylene terephthalate (PET) with a structured gold layer at the surface | PET: 3 × 4 cm$^2$; thickness 250 µm; PET: 1.5 × 0.9 cm$^2$; thickness 250 µm, Au: thickness 30 nm | Organic electronic |
| Glass with a photovoltaic cell at the surface | 25 × 25 mm$^2$; thickness 1.08 mm | Photovoltaic cell |
| Silicon chip | 3 × 3 cm$^2$; thickness 500 µm 1 × 1 cm$^2$; thickness 500 µm | Electronic |
| Micro-battery on silicon | 1 × 1 cm$^2$; thickness 500 µm | Energy storage |
| Bimetal material (e.g.: zinc/copper) | 3.5 × 2 cm$^2$; thickness 140 µm 5 × 1.6 cm$^2$; thickness 200 µm 7 × 1.6 cm$^2$; thickness 200 µm | Thermal, sensors |

Possible applications for the method which has just been described have been mentioned above.

A particular exemplary production of an opto-electronic device 62 will now be described with reference to FIG. 14.

It is made by stacking three assemblies 50 each built according to the method specific to the present invention. The assemblies 50 are then superimposed as is shown in the right part in FIG. 14, the substrates 38 providing the adhesion between the stacked assemblies. The assemblies are indeed superimposed so that for two directly consecutive assemblies 50, the first assembly comprises a substrate 38 arranged between the compact film of solid particles of this first assembly, and the compact film of solid particles of the second assembly, the substrate 38 being then in contact with and adhering to these two films 4.

enced 38b and covering the pads 84 of the photodiode 80c as well as the conductive beads 4, are electrically conductive.

The upper assembly 50 comprises a compact film of solid particles 4 which is also structured in several ways. First, it comprises ordered solid particles 4 of different compositions, since the clear beads 4 are electrically insulating whereas the grey tinted beads are made of a different material, which is electrically conductive. Furthermore, the structuration of this film also comes from its integration of two objects 80a, 80b.

The object 80a is a logic chip which is surrounded by particles 4. This chip 80a has bonding pads 84 directed upwards and downwards, the latter being intended to be in contact with the conductive areas 38b covering the pads 84 of the photodiodes 80*c*. The object 80*b* is a micro-battery lying on beads, in particular with its lower pads 84 lying on conductive beads of this upper assembly 50. In this respect, these electrically conductive beads 4 are intended to contact the areas 38*b* covering the conductive beads of the intermediate assembly 50.

The substrate 38 of this upper assembly 50 also has differentiated areas. The clearest, referenced 38*a*, are made of an electrically insulating material, and the darkest, referenced 38*b* and covering the pads 84 of both objects 80*a*, 80*b*, are electrically conductive.

Thus, once superimposed and adhering to each other, these three layer-shaped assemblies 50 make it possible to obtain an opto-electronic device 62 in which the solar energy are collected by the photovoltaic cell 80*d* transfers energy to the micro-battery 80*b*. In parallel, the transparent beads filter the solar spectrum before it is detected by the photodiode 80*c*, the detected signal being then processed by the chip 80*a*.

Of course, diverse modifications can be brought by those skilled in the art to the invention which has just been described, solely by way of non-limiting examples. In particular, the invention does not only apply to the production of an assembly with the compact film of running particles, but can be adapted to create an assembly with this film held static on the carrier liquid, until it is extracted together with the substrate.

The invention claimed is:

1. A method for producing an assembly of particles, comprising:
   making a compact film of solid particles floating on a surface of a carrier liquid;
   spraying particles onto a first face of the compact film which is opposite to a second face of the compact film which is immersed in the surface of said carrier liquid, to create a substrate-forming skin adhering to the solid particles; and
   extracting the assembly of particles from said carrier liquid, the assembly of particles comprising a substrate provided by said substrate-forming skin, and said compact film of solid particles bound by said substrate, wherein
   the carrier liquid is located in a transfer area comprising an inlet of said solid particles and an outlet of solid particles, wherein the transfer area is continuously supplied with said solid particles through the inlet, and the extracting the assembly of particles, comprising the substrate provided by the substrate-forming skin and the compact film of solid particles bound by the substrate, is continuously performed through the outlet.

2. The method according to claim 1, wherein the spraying the particles is performed by vaporization of a liquid or by nebulization.

3. The method according to claim 1, wherein the particles sprayed during the spraying comprise polymerizable monomers.

4. The method according to claim 1, wherein the particles sprayed during the spraying comprise photopolymerizable monomers.

5. The method according to claim 1, wherein the making the compact film of solid particles on the carrier liquid is implemented by making said solid particles build up on a stop placed at the outlet of the transfer area.

6. The method according to claim 5, wherein the stop is a roller and the extracting comprises extracting the assembly of particles through the outlet of the transfer area by rotating the roller.

7. The method according to claim 1, further comprising implementing a tilted ramp for circulating said solid particles, connected to the inlet of the transfer area, and on which the carrier liquid circulates.

8. The method according to claim 1, wherein the spraying the particles is performed to obtain the substrate-forming skin having a plurality of areas with different characteristics.

9. The method according to claim 8, wherein the different areas of the substrate have different compositions.

10. The method according to claim 8, wherein the different areas of the substrate are obtained using one or more masks.

11. The method according to claim 1, wherein the substrate-forming skin is made from a composition comprising a polymerizable, photo-crosslinkable compound.

12. The method according to claim 1, wherein the substrate-forming skin is made from a composition comprising acrylonitrile.

13. The method according to claim 1, wherein the compact film of solid particles holds at least one object selected from among silicon chips, micro-batteries, components of organic electronics, metal elements, photovoltaic cells, cells, and micro-cells.

14. The method according to claim 1, wherein the substrate-forming skin is made to have an average thickness between 1 and 100 µm.

15. A method for producing a device from at least two assemblies, each assembly being obtained by implementing a method according to claim 1, both assemblies being then superimposed.

16. The method according to claim 15, wherein the device is obtained from at least a first assembly and a second assembly superimposed and arranged in contact with each other, so that the first assembly comprises a substrate arranged between the compact film of solid particles of the first assembly and the compact film of solid particles of the second assembly, and so that the substrate comprises an electrically conductive area providing an electrical connection between electrically conductive parts of the compact films of solid particles of the first assembly and the second assembly.

17. The method according to claim 15, further comprising producing an optoelectronic device.

18. The method according to claim 1, wherein an average thickness of the substrate-forming skin corresponds to 50% to 99% of an average thickness of the assembly including the substrate and the film of solid particles bound by the substrate.

* * * * *